(12) United States Patent
Metzger, Jr.

(10) Patent No.: US 6,900,728 B2
(45) Date of Patent: May 31, 2005

(54) SYSTEM TO DETECT USER ENTRY INTO A DEFINED DANGER ZONE

(75) Inventor: James I. Metzger, Jr., Ballwin, MO (US)

(73) Assignee: Home Depot U.S.A., Inc., Atlanta, GA (US)

( * ) Notice: Subject to any disclaimer, the term of this patent is extended or adjusted under 35 U.S.C. 154(b) by 0 days.

(21) Appl. No.: 10/064,592

(22) Filed: Jul. 29, 2002

(65) Prior Publication Data

US 2004/0017294 A1 Jan. 29, 2004

(51) Int. Cl.$^7$ .............................................. G08B 13/26
(52) U.S. Cl. ..................... 340/562; 340/677; 30/166.3; 361/179; 192/129 R
(58) Field of Search ................................. 340/562, 561, 340/563, 677; 318/478; 144/372, 135.2, 137; 30/123.4, 165, 166.3, 370, 391; 83/68, 360, 544; 361/179; 192/129 R, 130 R, 130

(56) References Cited

U.S. PATENT DOCUMENTS

| | | | | | |
|---|---|---|---|---|---|
| 3,785,230 | A | * | 1/1974 | Lokey | 30/388 |
| 4,026,177 | A | | 5/1977 | Lokey | |
| 4,075,961 | A | * | 2/1978 | Harris | 112/277 |
| 4,145,940 | A | | 3/1979 | Woloveke et al. | |
| 4,249,117 | A | | 2/1981 | Leukhardt et al. | |
| 4,641,557 | A | | 2/1987 | Steiner et al. | |
| 5,042,348 | A | | 8/1991 | Brundage et al. | |
| 5,052,255 | A | | 10/1991 | Gaines | |
| 5,081,406 | A | * | 1/1992 | Hughes et al. | 318/478 |
| 5,823,255 | A | | 10/1998 | Swiatowy et al. | |
| 5,868,188 | A | * | 2/1999 | Fukuda | 144/372 |
| 5,942,975 | A | * | 8/1999 | Sørensen | 340/562 |
| 5,974,927 | A | | 11/1999 | Tsune | |
| 6,336,273 | B1 | | 1/2002 | Nilsson et al. | |
| 2002/0017175 | A1 | | 2/2002 | Gass et al. | |
| 2002/0017176 | A1 | | 2/2002 | Gass et al. | |
| 2002/0017178 | A1 | | 2/2002 | Gass et al. | |
| 2002/0017179 | A1 | | 2/2002 | Gass et al. | |
| 2002/0017180 | A1 | | 2/2002 | Gass et al. | |
| 2002/0017181 | A1 | | 2/2002 | Gass et al. | |
| 2002/0017182 | A1 | | 2/2002 | Gass et al. | |
| 2002/0017183 | A1 | | 2/2002 | Gass et al. | |
| 2002/0017184 | A1 | | 2/2002 | Gass et al. | |
| 2002/0017336 | A1 | | 2/2002 | Gass et al. | |
| 2002/0020261 | A1 | | 2/2002 | Gass et al. | |
| 2002/0020262 | A1 | | 2/2002 | Gass et al. | |
| 2002/0020263 | A1 | | 2/2002 | Gass et al. | |
| 2002/0020265 | A1 | | 2/2002 | Gass et al. | |
| 2002/0020271 | A1 | | 2/2002 | Gass et al. | |
| 2002/0056348 | A1 | | 5/2002 | Gass et al. | |
| 2002/0056349 | A1 | | 5/2002 | Gass et al. | |
| 2002/0056350 | A1 | | 5/2002 | Gass et al. | |
| 2002/0059853 | A1 | | 5/2002 | Gass et al. | |
| 2002/0059854 | A1 | | 5/2002 | Gass et al. | |
| 2002/0059855 | A1 | | 5/2002 | Gass et al. | |
| 2002/0066346 | A1 | | 6/2002 | Gass et al. | |
| 2002/0069734 | A1 | | 6/2002 | Gass et al. | |

* cited by examiner

Primary Examiner—Davetta W. Goins
(74) Attorney, Agent, or Firm—Robert B Dulaney, III

(57) ABSTRACT

A system and method for detecting user entry into a defined danger zone surrounding a saw blade includes a non-conducting member defining an opening therein for receiving a saw blade. The non-conducting member may comprise, for example, an insert received by an opening in the work surface or table of a table saw, scroll saw, band saw, miter saw, etc. Alternatively, it may comprise the blade guard of a radial arm saw or miter saw, for example. A conductive sensor is situated on the non-conducting member adjacent the opening to define a danger zone near the saw blade. A voltage source is coupled to the sensor, and a monitor circuit is configured to detect a change in the sensor's capacitance so as to signal a user entry into the danger zone.

23 Claims, 6 Drawing Sheets

SYSTEM TO DETECT USER ENTRY INTO A DEFINED DANGER ZONE

BACKGROUND OF INVENTION

1. Field of the Invention

The present invention relates generally to power saws, and more specifically, to a system for detecting a user entry into a defined danger zone surrounding a hazard such as a saw blade.

2. Description of Related Art

A variety of mechanisms that sense human contact with a saw blade are known. Such mechanisms may be used to actuate an emergency braking device to stop rotation of the saw blade in response to a user contacting the blade. These devices are often complicated and expensive to implement. Further, it may be desirable to sense a user's presence near the saw blade or other defined danger zone prior to the user contacting the blade.

The present application addresses these shortcomings associated with the prior art.

SUMMARY OF INVENTION

In accordance with aspects of the present invention, a system and method for detecting user entry into a defined danger zone surrounding a saw blade includes a non-conducting member defining an opening therein for receiving a saw blade. The non-conducting member may comprise, for example, an insert received by an opening in the work surface or table of a table saw, scroll saw, band saw, miter saw, etc. Alternatively, it may comprise the blade guard of a radial arm saw or miter saw, for example. A conductive sensor is situated on the non-conducting member adjacent the opening to define a danger zone near the saw blade. The conductive sensor possesses an electrical capacitance to its surroundings, sometimes referred to as capacitance to ground. A voltage source is coupled to the sensor and a monitor circuit is configured to detect a change in the capacitance caused by a user in close proximity to the sensor so as to signal a user entry into the danger zone.

In some exemplary embodiments of the invention, the sensor has an irregular shape to define enlarged danger zones at certain areas around the blade. In other embodiments, multiple sensors are provided to define multiple danger zones. For example, separate danger zones may be defined at the infeed and outfeed ends of the blade, as well as the area along the sides of the blade. Accordingly, different actions may be taken in response to a user entry into corresponding danger zones, such as activating an alarm in response to entry into one danger zone, and/or controlling operation of the saw's motor in response to entry into another danger zone.

BRIEF DESCRIPTION OF DRAWINGS

Other objects and advantages of the invention will become apparent upon reading the following detailed description and upon reference to the drawings in which.

Figure 1:
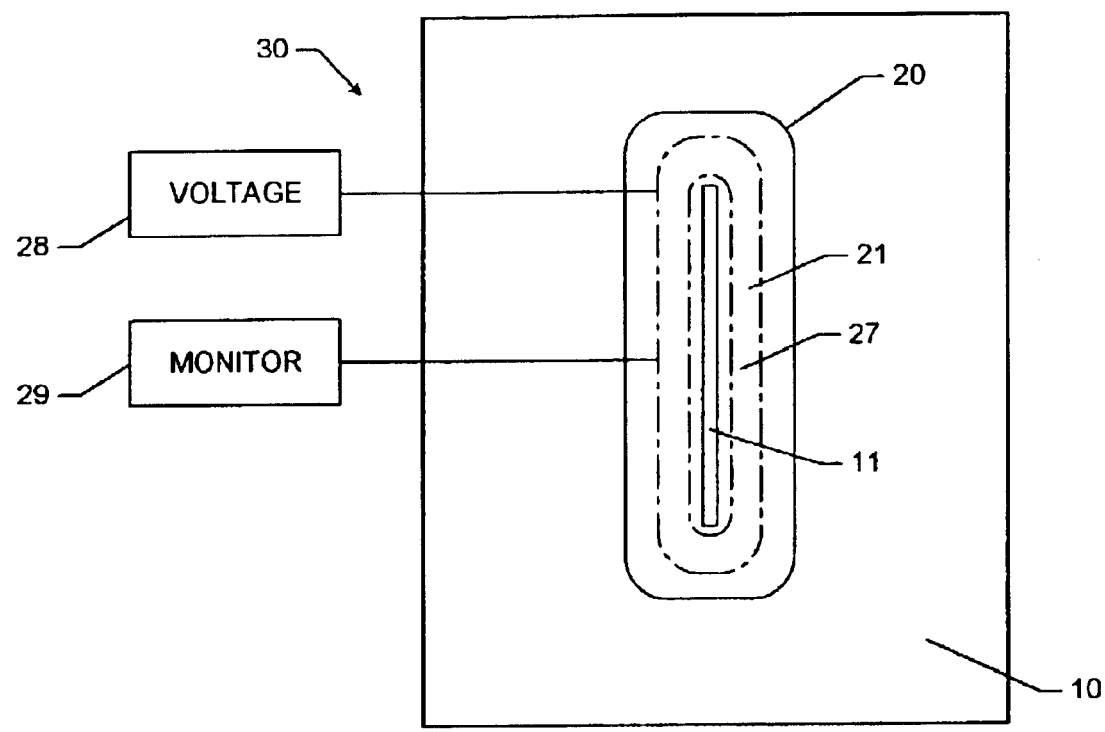
FIG. 1 is a block diagram schematically illustrating a system for detecting user entry into a defined danger zone in accordance with exemplary embodiments of the invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers" specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings and referring initially to the embodiment illustrated in FIG. 1, reference numeral 30 generally designates a system to detect user entry into defined danger zones of a power saw according to embodiments of the present invention. The system 30 shown in FIG.

1 includes an insert 20 made of a, non-conducting material such as plastic. The insert 20 defines a slot 11 for receiving a saw blade and is received by a table 10. Alternatively, the entire table 10 could be made of a non-conductive material, eliminating the need for the non-conducting insert 20. In certain embodiments, such as a table saw, the blade would extend from the underside of the table 10 up through the slot 11. The insert 20 may be removable to facilitate changing of the saw blade by giving access thereto from the upper side of the table 10. In other embodiments, such as a miter saw, the blade would be moved down by a user from above the table 10 to be received by the slot 11.

A conductive sensor 21 is situated on the insert 20 so as to define a danger zone 27. Typically, the danger zone 27 is an area adjacent the slot 11 that receives the saw blade. The system 30 of the present invention detects a user's entry into the danger zone 27 an area near the saw blade to activate an alarm or stop rotation of the blade, for example.

A voltage source 28 is connected to the sensor 21. The presence of a large conductive body, such as a user of the saw, will change the capacitance between the sensor and its surroundings. A monitoring circuit 29 detects changes in the capacitance to signal a user's entry into the defined danger zone 27. The monitoring circuit 29 is discussed further herein below.

Figure 2:
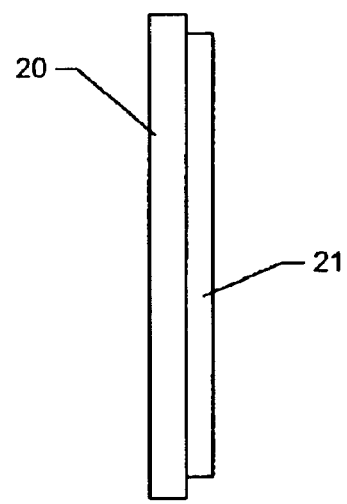
FIG. 2 is a side view of an insert and conductive sensor such as that shown in FIG. 1.

The sensor 21 may be situated in various locations relative to the insert 20. In FIG. 2, one embodiment of the present invention is shown with the conductive sensor 21 mounted on the underside of the insert 20.

Figure 3:
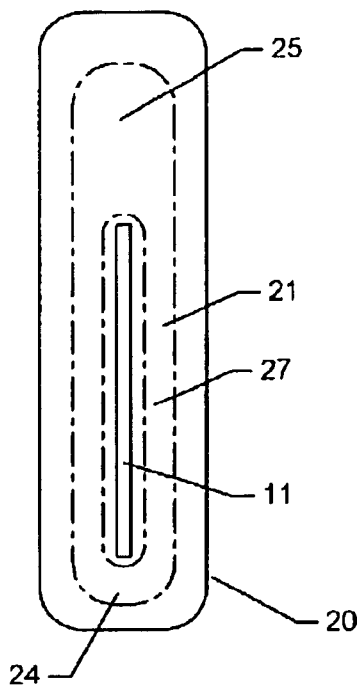
FIG. 3 schematically illustrates portions of a system for detecting user entry into a defined danger zone in accordance with further embodiments of the invention.
Figure 4:
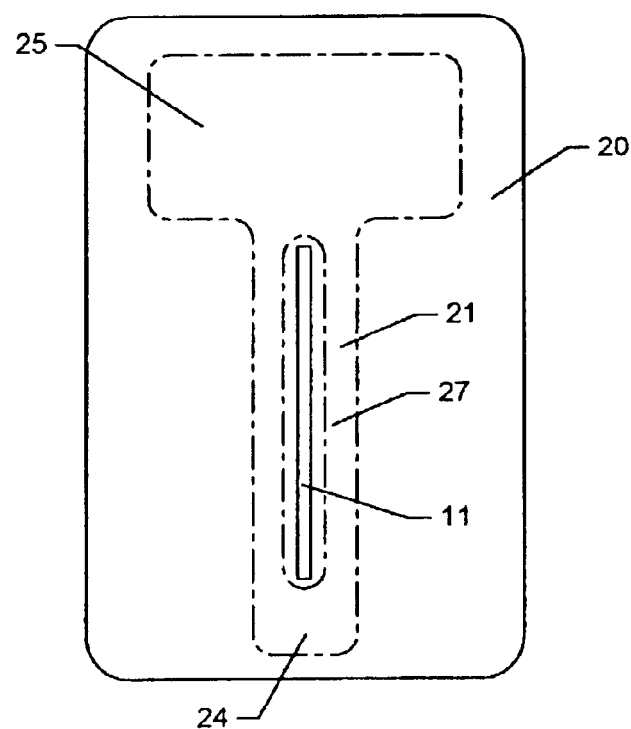
FIG. 4 is a block diagram schematically illustrating portions of a system for detecting user entry into a defined danger zone in accordance with still further embodiments of the invention.

FIGS. 3 and 4 depict further embodiments of the present invention. Generally, the insert 20 includes an infeed end 24 the end situated near the portion of the blade that initially receives the work piece being cut and an outfeed end 25 generally opposite the infeed 24. In the embodiments shown in FIGS. 3 and 4, the danger zone 27 defined by the sensor 21 is enlarged at the infeed 24 and outfeed ends 25. In FIG. 4, the danger zone 27 at the outfeed end 25 is further enlarged for increased reach-around detection. In other embodiments, only one of the infeed 24 or outfeed 25 ends has an enlarged danger zone.

Figure 5:
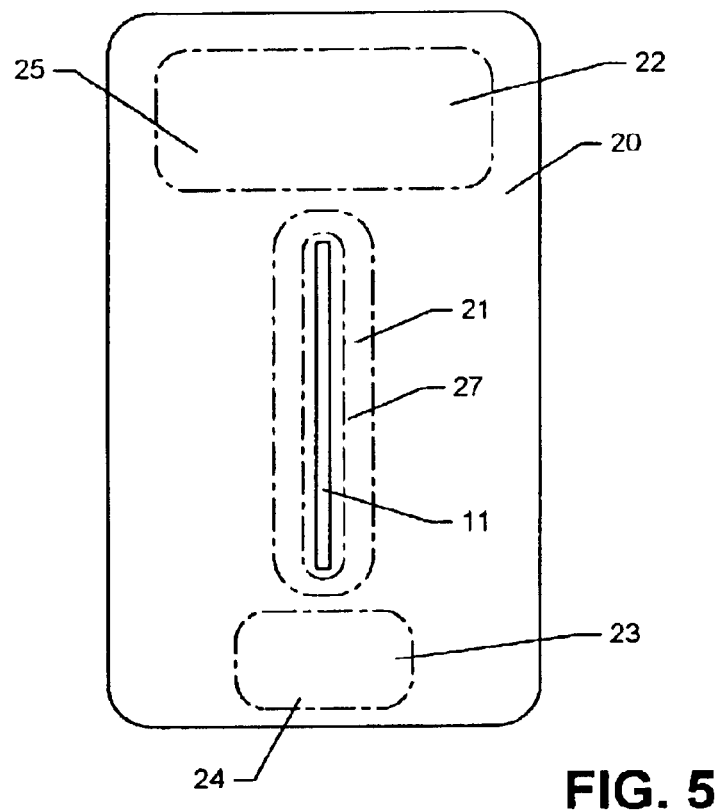
FIG. 5 is a block diagram schematically illustrating portions of a system for detecting user entry into multiple defined danger zones in accordance with embodiments of the invention.
Figure 6:
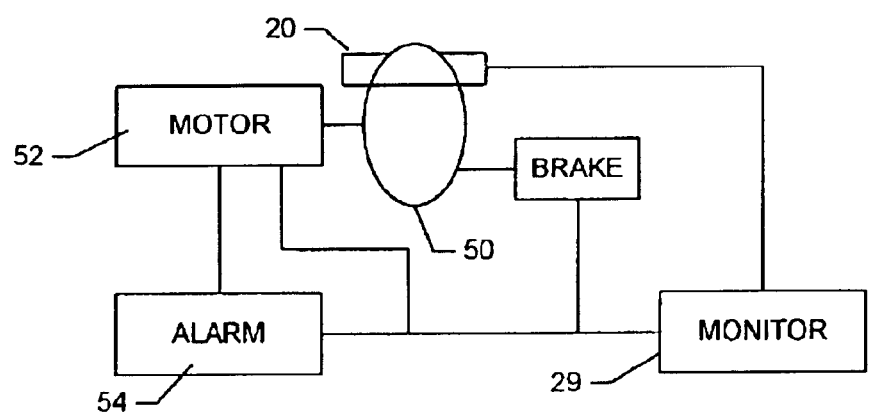
FIG. 6 conceptually illustrates a saw blade control system in accordance with aspects of the invention.

FIG. 5 illustrates another embodiment of the present invention with a separate sensor 22 defining a separate outfeed 25 danger zone and a separate sensor 23 defining a separate infeed 24 danger zone. By using a plurality of sensors to define danger zones, different actions may be taken upon sensing user entry into corresponding danger zones. For example, FIG. 6 conceptually illustrates a saw blade control system in accordance with aspects of the invention. The insert 20, including one or more sensors defining corresponding danger zones, is shown situated so as to surround a saw blade 50. The blade 50 is powered by a motor 52. Upon detecting a user entry into a danger zone by the monitor circuit 29, an alarm 54 may be activated and/or the motor 52 may be stopped or prevented from starting. A braking device could also be activated in response to detection of a user entry into the danger zone.

Where multiple danger zones are defined such as in the embodiment illustrated in FIG. 5, one action may be taken if a user entry into the outfeed 25 danger zone is detected, such as activating the alarm 54, while the motor may be stopped or prevented from starting upon detection of user entry into the infeed 24 danger zone.

Figure 7:
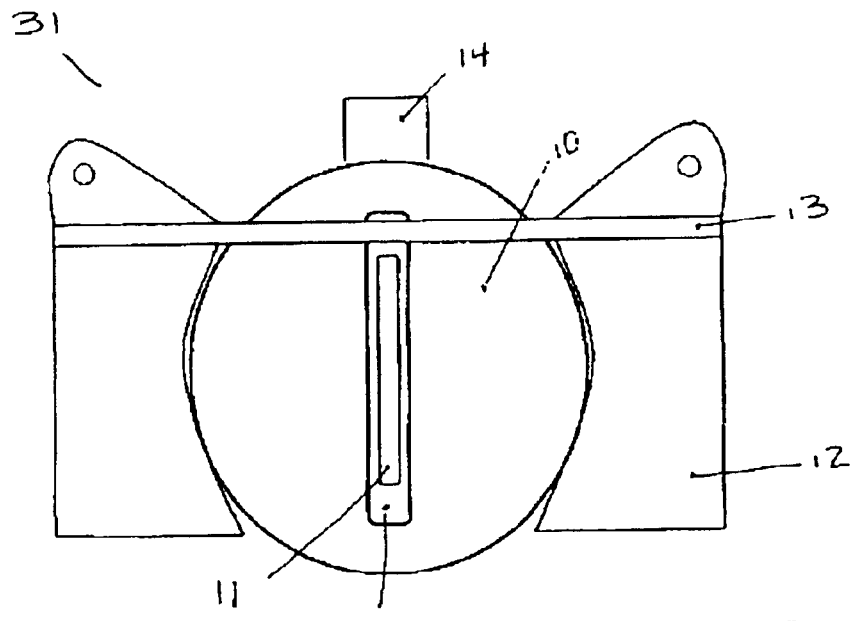
FIG. 7 conceptually illustrates a system for detecting user entry into a danger zone in an exemplary implementation in a miter saw.

FIG. 7 conceptually illustrates an exemplary implementation of the detection system in a miter saw. Reference numeral 31 generally depicts portions of the miter saw incorporating the detection system of the present invention.

The base 12 of the miter saw supports the table 10 and a rip fence 13, and a mounting 14 for an overhanging arm and blade (not shown). The insert 20, including one or more sensors defining corresponding danger zones is shown surrounding the slot 11 that receives the saw blade during cutting operations. Miter saws typically employ a trigger-controlled on-off switch. Accordingly, the monitor circuit may be configured to activate an alarm rather than start the motor if a user is detected in a danger zone.

Figure 8:
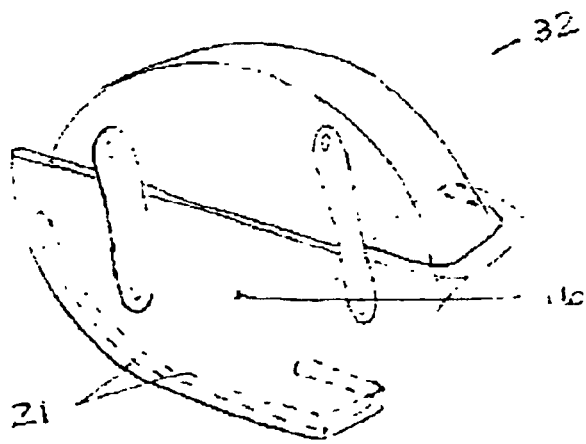
FIG. 8 is a perspective view generally illustrating a radial arm saw blade guard incorporating a detection system in accordance with aspects of the present invention.
Figure 9:
FIG. 9 is a close-up perspective view illustrating a portion of a blade guard having an enlarged infeed danger zone.

Turning to FIG. 8, the reference numeral 32 generally refers to a radial arm saw blade guard 16 incorporating a detection system in accordance with aspects of the present invention. A radial arm saw moves extensively relative to the table holding the work piece, so for a sensor system to be work well, the sensor system has to move along with the radial arm saw blade. Thus, in the embodiment illustrated in FIG. 7 the sensor 21 is connected to the lower portion of the guard 16. FIG. 9 shows a portion of the blade guard 16 the sensor 21 expanded to define an enlarged infeed danger zone 26.

Figure 10:
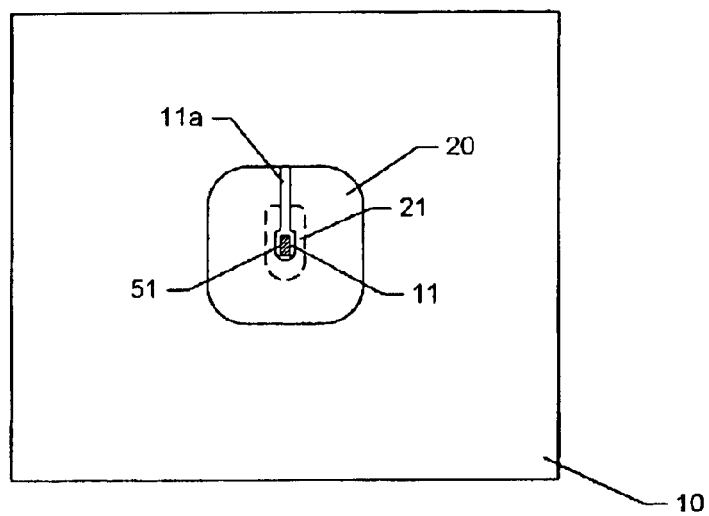
FIG. 10 diagram schematically illustrates portions of an exemplary system for detecting user entry into a defined danger zone suitable for use with a scroll saw or band saw.

FIG. 10 shows an insert 20 suitable for use in a scroll saw or band saw. The non-conducting insert 20 is received by the table 10 of the saw. A conductive sensor 21 is situated adjacent the opening 11 through which a blade 51 extends. The insert 20 may define a slot 11a, to allow removal of the insert 20 from the table 10 without first removing the blade 51.

As noted above, user entry into the danger zone is detected by monitoring the capacitance changes caused by a user coming in close proximity to the conductive sensor 21. A variety of approaches for sensing the proximity of a large conductive body are used in various exemplary embodiments of the invention.

Figure 11:
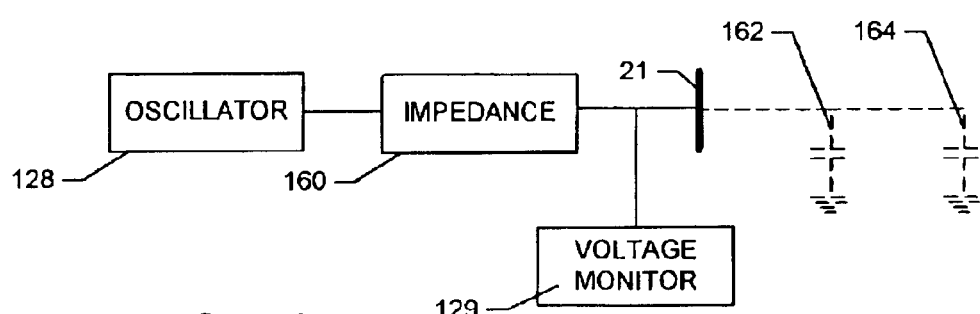
FIG. 11 is a schematic diagram illustrating a monitoring circuit for detecting user entry into a danger zone in accordance with an exemplary embodiment of the present invention.

FIG. 11 shows one embodiment of a monitoring circuit for detecting user entry into the danger zone. The voltage source comprises an oscillator 128 connected to the sensor 21 via an impedance 160. Reference numeral 162 represents the normal sensor 21 to ground capacitance, and reference numeral 164 represents the increase in capacitance resulting from the presence of a large body, such as a user. A voltage monitor 129 is connected to the sensor 21. The voltage drop through the impedance 160 due to the increased capacitive load 164 reduces the voltage at the sensor 21 and at the monitor 129, which is used to trigger an alarm or other action, such as stopping the saw motor or preventing it from starting.

Figure 12:
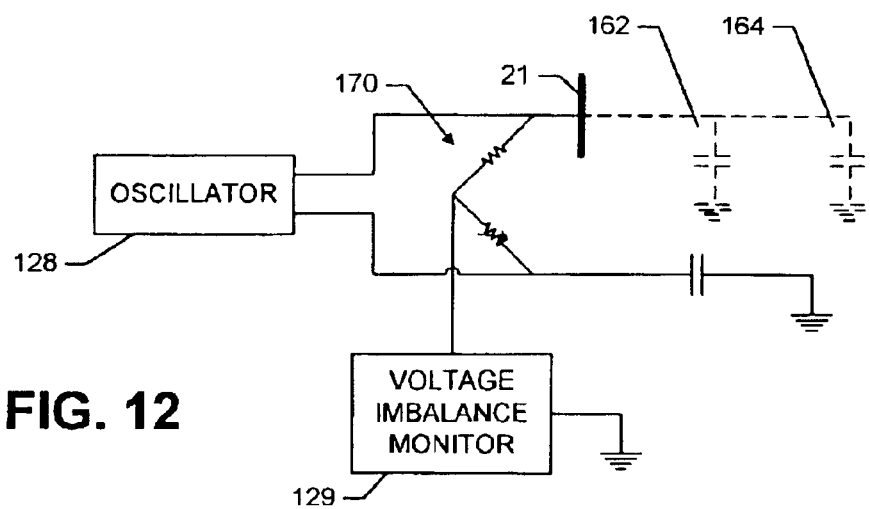
FIG. 12 is a schematic diagram illustrating a monitoring circuit for detecting user entry into a danger zone in accordance with another embodiment of the present invention.
Figure 13:
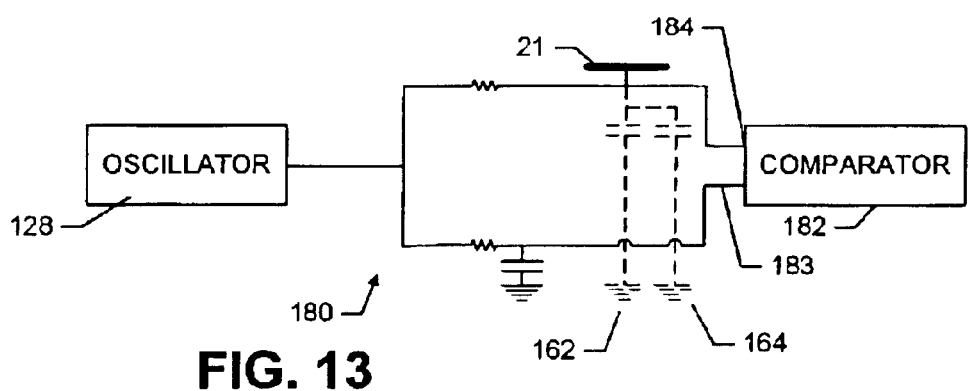
FIG. 13 is a schematic diagram illustrating a monitoring circuit for detecting user entry into a danger zone in accordance with a further exemplary embodiment of the present invention.
Figure 14:
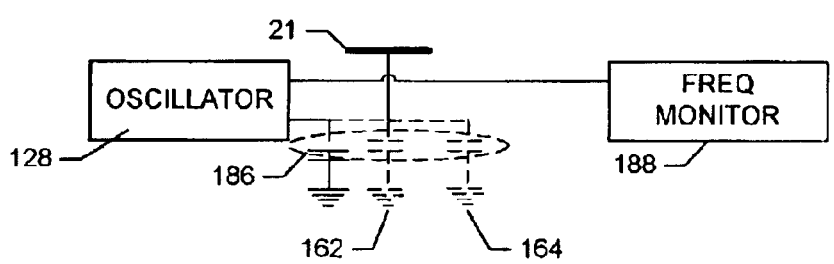
FIG. 14 is a schematic diagram illustrating a monitoring circuit for detecting user entry into a danger zone in accordance with a still further exemplary embodiment of the present invention.

In FIG. 12, the increase 164 in the sensor"s 21 capacitance to ground imbalances a bridge 170. A voltage monitor 129 is connected to the bridge 170 to sense the voltage imbalance at the bridge 170. In the circuit shown in FIG. 13, the increase 164 in the sensor"s 21 capacitance to ground imbalances a bridge 180 driving a comparator 182. A reference signal is coupled to one input 183 of the comparator 182, and the signal at the other input 184 of the comparator 182 varies with changes in the sensor 21 capacitance. In FIG. 14, the combined capacitance value 186 determines the frequency of the oscillator 128. When the capacitance 164 changes due to the presence of a large conductive body, the frequency changes. A circuit 188 is sensitive to changes in the output frequency of the oscillator 128 to sense the presence of a user in the danger zone.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for detecting user entry into a defined danger zone surrounding a saw blade, comprising:
   a non-conducting member defining an opening therein for receiving a saw blade;
   a conductive sensor situated on the non-conducting member adjacent the opening to define a danger zone;
   a voltage source for applying a voltage to the sensor; and
   a monitor circuit configured to detect a change in the capacitance of the sensor to signal a user entry into the danger zone.

2. The system of claim 1, wherein the sensor at least partially surrounds the opening.

3. The system of claim 2, wherein the non-conducting member defines an outfeed end, and wherein a portion of the sensor situated adjacent the outfeed end is enlarged to define an enlarged outfeed danger zone.

4. The system of claim 1, further comprising a plurality of sensors situated on the non-conducting member defining a plurality of danger zones.

5. The system of claim 4, wherein the non-conducting member defines infeed and outfeed ends, and wherein respective sensors are situated adjacent the infeed and outfeed ends to define infeed and outfeed danger zones.

6. The system of claim 1, further comprising an alarm circuit coupled to the monitor circuit for activating an alarm in response to the change in capacitance.

7. The system of claim 1, further comprising a motor control circuit coupled to the monitor circuit for controlling a motor driving the saw blade in response to the change in capacitance.

8. The system of claim 1, further comprising a blade braking device coupled to the monitor circuit for stopping the blade in response to the change in capacitance.

9. The system of claim 1, wherein the monitor circuit comprises:
   an impedance coupled between the voltage source and the sensor; and
   a voltage monitor coupled to the sensor to detect changes in the voltage drop across the impedance in response to the capacitance change.

10. The system of claim 1, wherein the monitor circuit comprises a bridge circuit coupled to the sensor, wherein the capacitance change imbalances the bridge.

11. The system of claim 10, wherein the bridge is coupled to a comparitor.

12. The system of claim 1, wherein the voltage source comprises an oscillator.

13. The system of claim 12, wherein the oscillator is tuned to a predetermined frequency, and wherein the frequency changes in response to the change in capacitance.

14. The system of claim 1, wherein the non-conductive member is receivable by an opening in a work surface.

15. The system of claim 1, wherein the non-conductive member forms a blade guard.

16. A power saw system, comprising:
   a blade;
   a motor driving the blade;
   a table for supporting a work piece, the table defining an opening therethrough;
   a non-conducting insert defining a slot therethrough for receiving a saw blade, the non-conducting insert received by the opening in the table;
   a conductive sensor situated on the insert adjacent the slot to define a danger zone;
   a voltage source for applying a voltage to the sensor; and
   a monitor circuit configured to detect a change in the capacitance of the sensor to signal a user entry into the danger zone.

17. The saw system of claim 16, further comprising an alarm circuit coupled to the monitor circuit for activating an alarm in response to the change in capacitance.

18. The saw system of claim 16, further comprising a motor control circuit coupled to the monitor circuit for controlling operation of the motor in response to the change in capacitance.

19. The saw system of claim 18, wherein the motor control circuit prevents the motor from starting in response to the change in capacitance.

20. The saw system of claim 18, further comprising a blade braking device coupled to the monitor circuit for stopping the blade in response to the change in capacitance.

21. A power saw system, comprising:
   a blade;
   a motor driving the blade;
   a non-conducting blade guard having the blade mounted therein;
   a conductive sensor situated on the blade guard adjacent the blade to define a danger zone;
   a voltage source for applying a voltage to the sensor; and
   a monitor circuit configured to detect a change in the capacitance of the sensor to signal a user entry into the danger zone.

22. A system for detecting user entry into a defined danger zone surrounding a saw blade, comprising:
   a non-conducting member defining an opening therein for receiving a saw blade;
   a conductive sensor situated on the non-conducting member adjacent the opening to define a danger zone;
   a voltage source for applying a voltage to the sensor; and
   means for detecting a change in the capacitance of the sensor to signal a user entry into the danger zone.

23. A method for detecting user entry into a defined danger zone surrounding a saw blade, comprising:
   situating a non-conducting member adjacent a saw blade, the non-conducting member having a conductive sensor attached thereto defining a danger zone;
   applying a voltage to the sensor; and
   detecting a change in the capacitance of the sensor to signal a user entry into the danger zone.

* * * * *